Jan. 6, 1959 W. BERNEY ET AL 2,867,255
CHEESE GRATER
Filed Nov. 1, 1956

INVENTORS
WILLIAM BERNEY
BY ROBERT C. BROWN
ATTORNEY

United States Patent Office 2,867,255
Patented Jan. 6, 1959

2,867,255

CHEESE GRATER

William Berney, New York, and Robert C. Brown, Jackson Heights, N. Y.

Application November 1, 1956, Serial No. 619,714

1 Claim. (Cl. 146—61)

This invention relates to cheese graters, and more specifically concerns a hand operated grater for providing grated or shaved cheese at the table.

An object of this invention is to provide a cheese grater in compact form which may be held in one hand and operated with the other hand.

Another object of this invention is to provide a cheese grater of the character described which includes a casing of neat appearance, allowing the same to be used as a table accessory, yet including mechanism for readily and quickly producing cheese in selected grated or shaved forms.

Yet another object of this invention is to provide a cheese grater made up of a minimum number of parts, which are quickly assembled or disassembled, which permits efficient cleaning of the several parts and easy loading of the grater.

A further object of this invention is to provide a cheese grater of the character described, which may be loaded with cheese in preformed block shapes complementary to the casing portion of the grater, said blocks being converted to grated form with substantially no waste.

Still a further object of this invention is to provide a cheese grater which may be manufactured economically; is light in weight, thereby facilitating the use thereof; and is easily manipulated in use, loading and cleaning.

Other objects of this invention will in part be obvious and in part hereinafter pointed out.

Figure 2:
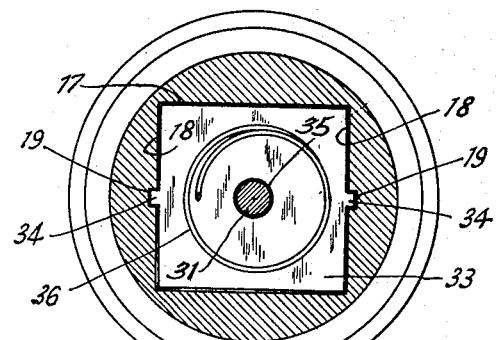
Fig. 2 is a transverse sectional view taken on the line 2—2 of Fig. 1.
Figure 1:
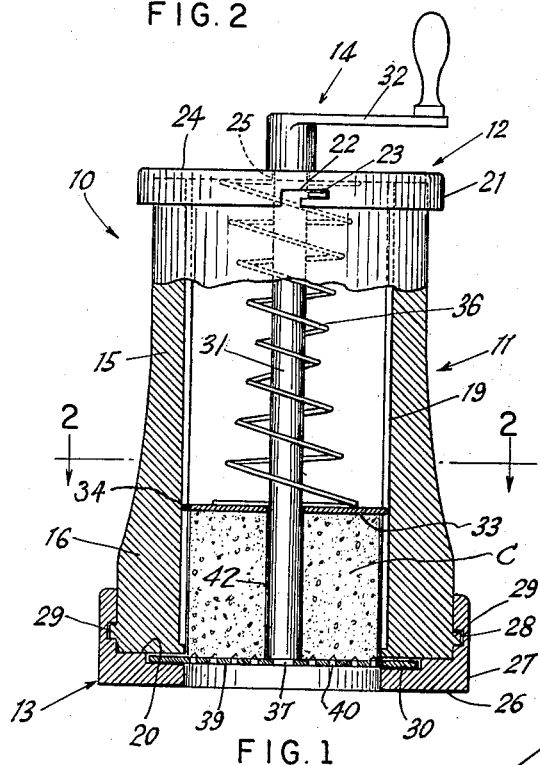
Fig. 1 is a vertical sectional view of a cheese grater embodying the invention.

Referring in detail to the drawing, and particularly to Figs. 1 and 2, 10 designates a cheese grater embodying the invention. The same comprises a hollow casing 11 open at the opposite ends thereof, a cap 12 removably mounted on one end thereof, a flanged grater disc retainer 13 removably mounted on the other end thereof, and a grater disc assembly 14.

The casing 11, which may be formed of molded plastic, wood or the like, is of generally cylindrical shape, as at 15 and flaring outwardly toward the lower end thereof as at 16. The casing 11 is formed with an axial bore 17 of square cross section, with one pair of opposite wall surfaces 18 of said bore being formed with opposed, longitudinally extending slots 19, which terminate at their lower ends, just short of end face 20 of the casing.

Cap 12, which may also be formed of molded plastic or the like, includes a flange 21 formed with a bayonet slot 22 for receiving therein a projecting nib 23 on casing 11. The wall 24 of cap 12 is formed with a central opening 25, for the purpose hereinafter appearing.

Retainer 13, which may also be formed of molded plastic or the like, comprises a circular rim portion 26 and a flange portion 27 formed with slots 28 on the inner surface thereof, such slots being of the spiral type to receive ribs 29 projecting from casing portion 16. Thus retainer 13 may be quickly screwed on to casing 11, bringing rim 26 into seating relation with end face 20 of the casing. Retainer rim portion 26 is rabbeted out on the inner face thereof, as at 30, for the purpose hereinafter appearing.

The grater disc assembly 14 comprises an axially disposed shaft 31, having an upper end portion projecting through cap opening 25, with a crank handle 32 affixed thereto. A follower plate 33 of square shape is slidably mounted on shaft 31, said plate including oppositely disposed projections or ears 34 which are receivable in casing slots 19, the plate being formed with a central opening 35 to pass said shaft 31. A coiled spring 36 is axially mounted about shaft 31, with one end of the spring bearing against follower plate 33 and the other end thereof bearing against the cap wall 24, thus urging said follower plate toward the lower open end of casing 11.

Figure 3:
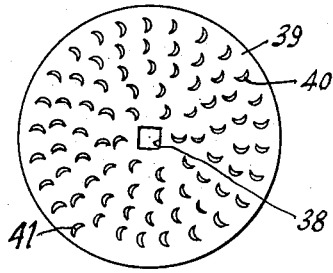
Fig. 3 is a plan view of the grater blade thereof.
Figure 4:
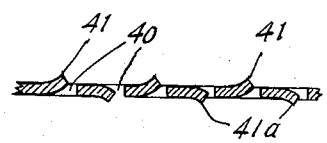
Fig. 4 is a transverse sectional view of a portion of the grater blade.

The lower end of shaft 31 is formed with a square projection 37 receivable in a square opening 38 formed in a circular grater disc 39. Said grater disc is formed with suitable openings 40 which may be crescent shaped, as shown in Fig. 3, or of other suitable shape, the material of the disc 39, such as metal or the like, being deflected at said openings from the plane of the disc to provide cutting edges 41. One group of cutting edges 41 may be located on one side of said disc, while another group of cutting edges 41a may be located on the other side of the disc. The two sets of cutting edges 41, 41a may be of different design to provide alternative cutting or grating actions.

Figure 5:
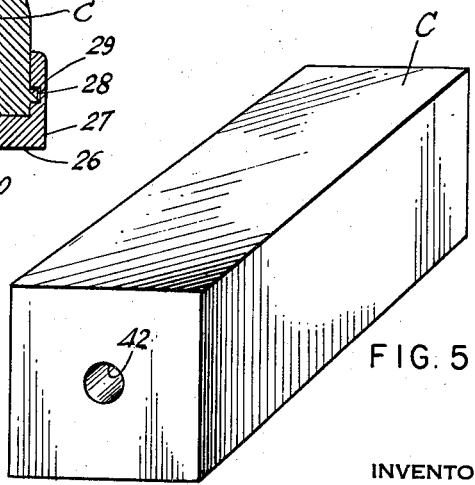
Fig. 5 is a perspective view of the block of cheese with which said grater is loaded.

The grater 10 may be loaded with a block of cheese C as shown in Fig. 5, said block being of square cross section and receivable in bore 17. The grater 10 is readily disassembled to load the same by removing cap 12, spring 36 and shaft 31. The block of cheese C which has been previously formed with an axial bore 42, is disposed in casing bore 17. The follower plate 33 is positioned on the upper end of the cheese block, together with the shaft 31, spring 36 and cap 12; the shaft passing through bore 42. The projection 37 on shaft 31 is received in opening 38 of the grater disc 39 to complete the assembly.

It will be apparent that casing 11 may be held in one hand while the other hand turns crank handle 32, thereby turning grater disc 39 against the lower face of cheese block C to produce gratings or shavings of cheese which pass outwardly through openings 40. The disc 39 may be reversed in its position in respect to end face 20 of casing 11, thereby selecting the particular cutting edges 41, 41a for engagement with the cheese block face to produce the desired form of gratings.

Retainer 13 may be quickly unscrewed to allow for reversal of the grater disc 39, or to facilitate washing of the grater, at which time cap 12 and grater assembly 14 is also removed. In this manner, the grater may be kept clean at all times with a minimum amount of effort.

The casing 11 is of pleasing appearance and will not detract from the appearance of a table setting, when in use or when laid aside on the table. The cheese block C will not turn within casing 11 and spring 36 will be effective to advance said block against the cutting edges on grater disc 39 at all times. The follower plate 33 will move downwardly within casing bore 17 until ears 34 thereon reach the bottom of slots 19 in the casing, thereby stopping the plate just short of the grater disc 39.

As various changes might be made in the embodiment of the invention herein shown without departing from the spirit thereof, it is understood that all matter herein shown shall be deemed illustrative and not by way of limitation except as set forth in the appended claim.

Having thus disclosed our invention, we claim as new and desire to protect by Letters Patent:

A grater comprising a casing open at the opposite ends thereof and having a substantially cylindrical outer surface and an axial bore of square cross section for receiving therein a block of gratable material of square cross section, a removable cap mounted on one end of said casing for closing one end of said bore, a circular grater disc having marginal portions thereof abutting flat end portions at the other end of said casing, an annular retainer detachably mounted on the other end of said casing and including a rim portion for holding the marginal portions of said disc against the flat end portion at the other end of said casing, said retainer rim portion being formed on the inner surface thereof with an annular rabbet to receive the marginal portions of said disc, means for rotating said disc relative to said casing end and retainer comprising a shaft extending axially through said bore, one end of said shaft being detachably engaged with said disc, the other end of said shaft passing through said cap, handle means on the projecting end of said shaft, follower means slidably mounted on said shaft within said bore, spring means on said shaft having one end thereof abutting said cap and the other end thereof abutting said follower means, said follower means and spring being operative to urge said block of material toward said disc whereby the forward face portions of said block of material is grated by said disc as said handle means is turned.

References Cited in the file of this patent

UNITED STATES PATENTS

| | | |
|---|---|---|
| 1,041,754 | Doolittle | Oct. 22, 1912 |
| 1,890,091 | Maestro | Dec. 6, 1932 |
| 2,700,995 | Ritter | Feb. 1, 1955 |

FOREIGN PATENTS

| | | |
|---|---|---|
| 61,145 | Germany | Feb. 17, 1892 |
| 448,613 | Italy | May 23, 1949 |